(12) United States Patent
Kim

(10) Patent No.: US 7,270,766 B2  
(45) Date of Patent: Sep. 18, 2007

(54) FEED WATER COMPOSITION FOR BOILERS

(76) Inventor: Young Nam Kim, Shin Dae Woo Villart 303, Goejeong 1-Dong, Saha-Gu, Busan 604-815 (KR)

( * ) Notice: Subject to any disclaimer, the term of this patent is extended or adjusted under 35 U.S.C. 154(b) by 22 days.

(21) Appl. No.: 10/554,815

(22) PCT Filed: Jul. 8, 2004

(86) PCT No.: PCT/KR2004/001688

§ 371 (c)(1), (2), (4) Date: Oct. 27, 2005

(87) PCT Pub. No.: WO2005/007772

PCT Pub. Date: Jan. 27, 2005

(65) Prior Publication Data

US 2006/0231790 A1    Oct. 19, 2006

(30) Foreign Application Priority Data

Jul. 16, 2003    (KR) .................. 10-2003-0048641

(51) Int. Cl.
*C09K 5/10* (2006.01)
*C23F 11/12* (2006.01)

(52) U.S. Cl. .......... 252/68; 106/14.15; 106/14.41; 106/14.42; 252/67; 252/70; 252/71; 252/73; 252/74; 252/75; 252/76; 252/77; 252/175; 252/180; 252/389.61; 252/389.62

(58) Field of Classification Search ............ 106/14.41, 106/14.42, 14.15; 252/389.61, 389.62, 67, 252/68, 70, 71, 73, 74, 75, 76, 77, 175, 180
See application file for complete search history.

(56) References Cited

U.S. PATENT DOCUMENTS

| | | | | |
|---|---|---|---|---|
| 5,080,818 A | * | 1/1992 | Tachiiwa et al. | 252/75 |
| 5,387,360 A | * | 2/1995 | Uekusa et al. | 252/73 |
| 5,811,025 A | | 9/1998 | Kawai et al. | |
| 5,997,763 A | | 12/1999 | Pabon et al. | |
| 6,045,719 A | * | 4/2000 | Meszaros et al. | 252/77 |
| 6,126,851 A | * | 10/2000 | Miyake et al. | 252/76 |
| 6,228,283 B1 | * | 5/2001 | Turcotte et al. | 252/76 |
| 6,585,933 B1 | * | 7/2003 | Ehrhardt et al. | 422/16 |
| 6,802,988 B1 | * | 10/2004 | Wenderoth et al. | 252/73 |
| 6,818,147 B2 | * | 11/2004 | Wenderoth et al. | 252/73 |

FOREIGN PATENT DOCUMENTS

| | | | |
|---|---|---|---|
| DE | 19547499 A1 | * | 5/1997 |
| JP | 60-243185 A | * | 12/1985 |
| KR | 10199400002676 | | 3/1994 |
| KR | 1998057337 | | 9/1998 |
| WO | WO2005/047419 A1 | * | 5/2005 |

OTHER PUBLICATIONS

Derwent Acc No. 2000-268329, abstract of Russian Patent Specification No. RU 2125074C1 (Jan. 1999).*

Derwent Acc No. 2006-204756, abstract of Chinese Patent Specification No. CN1256400C (May 17, 2006).*

* cited by examiner

Primary Examiner—Anthony J. Green
(74) Attorney, Agent, or Firm—IPLA P.A.; James E. Bame

(57) ABSTRACT

"Disclosed is a feed water composition for boilers whose main ingredient is a purified ethylene glycol aqueous solution that is a mixture of purified ethylene glycol and pure water in a weight ratio of 70-90 : 10-30 wt %. The feed water composition comprises 92.1 to 98.8 wt % of the purified ethylene glycol aqueous solution, 0.1 to 2.0 wt % of sodium benrzoate, 0.1 to 1.5 wt % of tolyltriazole, 0.1 to 0.7 wt % of triethanol amine, 0.5 to 1.5 wt % of sodium nitrate, 0.3 to 1.2 wt % of sodium molybdate, and 0.1 to 1.0 wt % of potassium hydroxide."

11 Claims, No Drawings

FEED WATER COMPOSITION FOR BOILERS

TECHNICAL FIELD

The present invention relates to a feed water composition for boilers, and more particularly to a feed water composition for boilers, which contains a mixture of purified glycol and pure water as main components, and also proper amounts of sodium benzoate, tolyltriazole, triethanol amine, sodium nitrate, sodium molybdate, and potassium hydroxide as additives for preventing the corrosion of internal combustion engines and pipes for boilers.

BACKGROUND ART

The feed water for boilers that has now been used is the tap water. But the latter water causes the corrosion of internal engines and pipes for boilers, thus generating scales. This hampers the smooth circulation of feed water and reduces the thermal efficiency of boilers. Also, the precipitation of scales, etc. can cause the problem of stopping and blocking the circulation system. In addition, it can generate the problem of reducing the boiler's lifetime, etc.

In particular, if the boiler is off at a vacant house in winter, internal engines and pipes for boilers may freeze and crack due to the expansion of water. This generates problems such as economic loss including energy loss and the damage in boilers, and inconvenience.

Also, since the thermal conductivity of the tap water is low, the energy loss is high. At the same time, since the evaporation rate of the tap water is very high, the water should be replenished frequently, thus causing inconvenience.

DISCLOSURE OF INVENTION

Technical Problem

To solve these problems, KR patent application laid-open No. 1988-554 (Mar. 26, 1988) and KR patent application laid-open No. 1988-4064 (Jun. 12, 1988) disclose 'a liquid composition for thermal media', which contains ethylene glycol and water as main components. But these patents use asbestos and emulsifiers that are contained in the liquid composition. These chemicals adhere to internal engines and pipes for boilers, thus generating scales and damaging the engines. JP patent application laid-open publication No. sho 60-60178 discloses a 'thermal media for boilers' whose main ingredient is ethylene glycol aqueous solution or propylene glycol aqueous solution. In this patent, the content of phosphate ions is limited to less than 50 ppm, in order to prevent the generation of scales. But since corrosion-preventing agents proper for various metals are not contained, the thermal media disclosed in the patent has a problem in that it cannot prevent the corrosion of internal engines and pipes for boilers.

Technical Solution

Therefore, the present invention has been made to solve the above-mentioned problems occurring in the prior art. An object of the present invention is to provide a feed water composition for boilers, which prevents the corrosion and scales generated in internal engines and pipes for boilers, such that it is circulated smoothly and shows increased thermal efficiency.

Another object of the present invention is to provide a feed water composition for boilers, which can prevent the cracking of internal engines and pipes for boilers, since the boiler feed water does not freeze even when the boiler is off for energy saving at a vacant house in winter.

Still another object of the present invention is to provide a feed water composition for boilers, which contains purified glycol and pure water as main components, and also various additives, so that it can be used semi-permanently without replacement.

To achieve these objects, the present invention provides a feed water composition for boilers, which contains a suitable ratio of purified glycol and pure water, and also various additives.

Advantageous Effects

As described above, the present invention provides the feed water composition for boilers, which contains the purified glycol aqueous solution consisting of purified glycol and pure water, and also various additives. The use of this feed water composition can prevent the formation of corrosion and scales on internal engines and pipes for boilers, thus making the circulation of the feed water smooth. Also, the feed water can be used semi-permanently without replacement.

The boiler operation time required for heating the inventive feed water composition to 100° C. was reduced by 13.7-20.0% as compared to that for the tap water, meaning energy saving as much. Also, an increase in temperature after heating for 30 minutes was 45.37% higher in the feed water of the present invention than that in the tap water. At 30 minutes after stopping heating, a reduction in the temperature was 46.55% lower in the inventive feed water composition than that in tap water. This implies that the inventive feed water composition shows a very high thermal efficiency during the boiler operation.

Also, the feed water composition of the present invention has a low freezing point. Therefore in severe winter, it does not freeze even when the power of the boiler is off at a vacant house for energy saving. This removes the possibility of cracking internal engines and pipes for boilers.

BEST MODE

Hereinafter, the feed water composition for boilers according to the present invention will be described in detail.

The present invention relates to a feed water composition for boilers (hereinafter, referred to as 'feed water'), which contains 92.1-98.8 wt % of a mixture of purified glycol and pure water in a weight ratio of 70-90:10-30, 0.1-2.0 wt % of sodium benzoate, 0.1-1.5 wt % of tolyltriazole, 0.1-0.7 wt % of triethanol amine, 0.5-1.5 wt % of sodium nitrate, 0.3-1.2 wt % of sodium molybdate, and 0.1-1.0 wt % of potassium hydroxide.

The purified glycol aqueous solution used in the present invention is a mixture of purified glycol and pure water in a weight ratio of 70-90:10-30, and is used at the amount of 92.1 to 98.8 wt % relative to the total weight of the inventive feed water composition taken as 100 wt %. If the content of purified glycol in the purified glycol aqueous solution is less than 70 wt %, the freezing point of the composition will be elevated. Thus in winter, there is the possibility that internal engines and pipes for boilers may crack. On the other hand, if the content exceeds 90 wt %, the heating time of the feed water will be shortened but additives will not be dissolved completely since the amount of pure water is small. The purified glycol used in the present invention is purified ethylene glycol or propylene glycol, and preferably purified ethylene glycol. Since purified glycol itself has no capacity to prevent corrosion, various additives such as those below should be added.

Sodium benzoate used in the feed water of the present invention is to prevent the corrosion of iron-based materials such as cast iron and steel and is added at the amount of 0.1 to 2.0 wt %, and preferably 0.5 to 1.0 wt %, relative to the total weight of the feed water composition taken as 100 wt %. If its content is less than 0.1 wt %, a sodium benzoate coating film sufficient for preventing the corrosion of iron will not be formed, thus generating corrosion. If the content exceeds 2.0 wt %, sodium benzoate will not be dissolved sufficiently so that the effect of preventing corrosion is reduced.

Tolyltriazole used in the present invention serves to prevent the corrosion of copper and its alloys and is added at the amount of 0.1 to 1.5 wt %, and preferably 0.4 to 1.0 wt %, relative to the total, weight of the composition taken as 100 wt %. If its content is less than 0.1 wt %, a coating film sufficient to prevent the corrosion of copper will not be formed on copper, thus generating corrosion. If its content exceeds 1.5 wt %, tolyltriazole will not be dissolved completely, thus causing the generation of scales. In the present invention, tolyltriazole may be used alone or in a combination with one of benzotriazole and mercapto benzotriazole.

Tri ethanol amine used in the present invention is used to prevent the corrosion of aluminum and iron and is added at the amount of 0.1 to 0.7 wt %, and preferably 0.2 to 0.5 wt %, relative to the total weight of the composition taken as 100 wt %. If its content is less than 0.1 wt %, films formed on aluminum and iron will be imperfect, thus generating the corrosion of aluminum and iron. If its content exceeds 0.7 wt %, its dissolution will be insufficient, so that the triethanol amine can react with coexisting nitrite to produce nitroso amine, which is a cause of pollution. In the present invention, one or more selected from the group consisting of diethanol amine, monoethanol amine, triisopanol amine, diisopropanol amine, and cyclohexyl amine may also be used as a substitute for triethanol amine.

Sodium nitrate used in the present invention is added to prevent the corrosion of iron at the amount of 0.5 to 1.5 wt %, and preferably 0.9 to 1.3 wt %, relative to the total weight of the composition taken as 100 wt %. If its content is less than 0.5 wt %, a coating film formed on iron will be insufficient, generating corrosion. If its content exceeds 1.5 wt %, its dissolution will be incomplete, causing the generation of scales. When it coexists with amine, they can react each other to produce nitroso amine. In the present invention, sodium nitrate may be used alone or in a combination with one of magnesium nitrate and strontium nitrate.

Sodium molybdate used in the present invention serves to ensure the stability of these corrosion prevention additives and is added at the amount of 0.3 to 1.2 wt %, and preferably 0.6 to 1.0 wt %, relative to the total weight of the composition taken as 100 wt %. If the content of sodium molybdate is out of this range, it may cause an adverse effect on corrosion prevention.

Potassium hydroxide used in the present invention is added to adjust pH of the feed water at the amount of 0.1 to 1.0 wt %, and preferably 0.2 to 0.5 wt %, relative to the total weight of the composition taken as 100 wt %. Potassium hydroxide in this content range maintains the feed water at a pH range of 7.5 to 9.0. In the present invention, sodium hydroxide may also be used in place of potassium hydroxide.

Mode for Invention

Hereinafter, the present invention will be explained in detail using the following examples. It will however obvious to a person skilled in the art that the scope of the present invention is not limited to these examples.

Example 1 TO 3 and Comparative Examples 1 to 3

The freezing point of a mixture if purified ethylene glycol and pure water, and the boiler operation time required to heat the mixture to 100° C., were measured at various mixing ratios of purified ethylene glycol and pure water. The results are given in Table 1 below.

TABLE 1

| | (unit: wt %) | | | | | |
|---|---|---|---|---|---|---|
| Classification | Ex. 1 | Ex. 2 | Ex. 3 | CE. 1 | CE. 2 | CE. 3 |
| Purified ethylene glyol | 70.0 | 80.0 | 90.0 | 40.0 | 50.0 | 60.0 |
| Pure water | 30.0 | 20.0 | 10.0 | 60.0 | 50.0 | 40.0 |
| Freezing point | −64.0 | −79.0 | −95.0 | −25.0 | −37.0 | −50.0 |
| Operation time for heating to 100° C. | 8 min 54 sec | 8 min 28 sec | 8 min 15 sec | 9 min 39 sec | 9 min 30 sec | 9 min 15 sec |

* Remark: The boiler operation time required to heat tap water to 100° C. is 10 min 19 sec.
* Ex: Example, CE.: Comparative Example As evident from Table 1 above, the boiler operation time required for heating each mixture of Examples 1-3 of purified ethylene glycol and pure water in a weight ratio of 70-90:10-30 to a temperature of 100° C. was in a range from 8 min 15 sec to 8 min 54 sec, suggesting that the boiler operation time for the mixture is 13.7-20.0% shorter than 10 min 19 sec for tap water. In the cases of Comparative Examples 1 to 3, since the mixing ratio between purified ethylene glycol and pure water is out of the range of the present invention, the boiler operation time increased as compared to Examples 1 to 3, meaning that the boiler energy efficiency is reduced. In particular, the freezing point of Comparative Example 1 was −25° C., suggesting that internal engines and pipes for boilers may crack in severe cold weather occurring in a given interval.

Therefore, the inventive boiler feed water containing the purified ethylene glycol aqueous solution as a main component has excellent performances. Thus, it can be found that the inventive boiler feed water reduces energy as much as the reduced amount of the boiler operation time required for its heating, and the thermal efficiency during boiler operation is increased as much.

Example 4 and Comparative Example 4

Example 4 is a feed water composition for boilers, which contains the purified ethylene glycol aqueous solution of Example 2 and various additives, and Comparative Example 4 that is tap water, were measured for temperatures after heating and cooling, every five minutes for 30 minutes. The measurement results are shown in Table 2 below.

TABLE 2

| Classification | Heating Temperature (° C.) | | | | | | | Cooling Temperature (° C.) | | | | | |
|---|---|---|---|---|---|---|---|---|---|---|---|---|---|
| | 0 | 5 | 10 | 15 | 20 | 25 | 30 | 35 | 40 | 45 | 50 | 55 | 60 |
| Ex. 4 | 18.0 | 58.0 | 83.0 | 105.0 | 123.0 | 140.0 | 157.0 | 140.0 | 124.0 | 112.0 | 101.0 | 92.0 | 85.0 |
| CE. 4 | 18.0 | 45.0 | 65.0 | 86.0 | 102.0 | 107.0 | 108.0 | 88.0 | 80.0 | 74.0 | 69.0 | 63.0 | 58.0 |
| Temp. Diff. | — | 13.0 | 18.0 | 19.0 | 21.0 | 33.0 | 49.0 | 52.0 | 44.0 | 38.0 | 32.0 | 29.0 | 27.0 |

* Ex. 4: Example 4
CE. 4: Comparative Example 4
Temp. Diff.: Temperature Difference As evident from Table 2 above, after 30 minutes of heating, Example 4 showed 157° C., which is 49° C. higher than 108° C. for Comparative Example 4. This means that Example 4 shows a temperature increase of 45.37%, as compared to Comparative Example 4. At 30 minutes after stopping heating, the temperature of Example 4 was 85.0° C., which is 27° C. higher than 58° C. for Comparative Example 4. This means that temperature cools down 46.55% slower in Example 4 than in Comparative Example 4. Therefore, it could be found that the feed water composition of the present invention is an excellent energy effect due to a rapid increase in temperature when heating and a slow reduction in temperature when stopping heating.

In Tables 1 and 2 above, the operation times required for heating to 100° C. were shown to be different. The reason is that in Table 2, the feed water composition containing various additives was used, and the amounts of the feed water samples were 60 ml in Table 1 and 120 ml in Table 2.

Examples 5 to 7 and Comparative Examples 5 to 7

At first, the purified ethylene glycol aqueous solution of Example 2 was made by mixing purified ethylene glycol and pure water in a weight ratio of 80:20, and then the additives shown in Table 3 were added to the resulting mixture to make Examples 5 to 7 and Comparative Examples 5 to 7.

TABLE 3

| | Content (wt %) | | | | | |
|---|---|---|---|---|---|---|
| Ingredient | Ex. 5 | Ex. 6 | Ex. 7 | CE. 5 | CE. 6 | CE. 7 |
| Purified ethylene glycol aqueous solution | 98.9 | 95.5 | 92.1 | 99.6 | 88.0 | 96.9 |
| Sodium benzoate | 0.1 | 1.0 | 2.0 | 0.05 | 2.5 | 1.0 |
| Tolyltriazole | 0.1 | 0.7 | 1.5 | 0.05 | 2.0 | 0.7 |
| Triethanolamine | 0.1 | 0.4 | 0.7 | 0.05 | 1.5 | 0.4 |
| Sodium nitrate | 0.5 | 1.0 | 1.5 | 0.1 | 2.5 | 1.0 |
| Sodium molybdate | 0.3 | 0.8 | 1.2 | 0.1 | 2.0 | — |
| Potassium hydroxide | 0.1 | 0.6 | 1.0 | 0.05 | 1.5 | — |

* Ex: example, CE: comparative example

The corrosion test results for Examples 5 to 7 and Comparative Examples 5 to 7 are given in Table 4 below.

TABLE 4

| Classification | | Ex. 5 | Ex. 6 | Ex. 7 | CE. 5 | CE. 6 | CE. 7 |
|---|---|---|---|---|---|---|---|
| Reduction in Weight by corrosin (mg/cm$^2$) | Aluminum | 0.09 | 0.06 | 0.08 | 0.13 | 0.12 | 0.14 |
| | Cast iron | 0.06 | 0.04 | 0.05 | 0.10 | 0.09 | 0.10 |
| | Steel | 0.05 | 0.03 | 0.04 | 0.09 | 0.07 | 0.08 |
| | Brass | 0.04 | 0.02 | 0.03 | 0.06 | 0.05 | 0.07 |
| | Lead | 0.08 | 0.03 | 0.04 | 0.07 | 0.07 | 0.09 |
| | Copper | 0.03 | 0.02 | 0.02 | 0.06 | 0.04 | 0.06 |

In Comparative Examples 5 and 6, since the additives are out of the content ranges of the present invention, the weights of various metal test pieces were reduced a great deal, as compared to Examples 5 to 7, indicating that corrosion was severe. In the case of Comparative Example 7, sodium molybdate, which is a stabilizer, and potassium hydroxide, which is a pH adjuster, were not added, and thus, various corrosion-preventing agents were not stabilized and the pH of the feed water was not adjusted to be within 7.5 to 9.0. Hence, the weight of various metal test pieces was reduced a great deal as compared to Examples 5 to 7, meaning severe corrosion.

The freezing point and the boiler operation time required for heating to 100° C. in Table 1, the temperatures at various times after heating and cooling in Table 2, and the weight reduction by corrosion in Table 4 were measured in the following ways.

1. Freezing Point Test

The test solutions of 30 vol % and 50 vol % were manufactured using the feed water. 75-100 ml of the test solutions were put into the cooling pipe of the freezing point measuring device, a stirrer and a thermometer were installed using a cork or rubber stopper, and the lower end of the thermometer was put in the center of the test solutions. The cooling pipe was placed in the cooling liquid made of acetone or methanol and dry ice. The surface of the test solution was controlled to be about 10 mm below the surface of the cooling liquid. Then cooling was started while the stirrer was operated 60 to 80 times per minute. The temperature was recorded every minute. The freezing point is the temperature where it flattens. The freezing point was measured twice and their average was reported.

2. Heating Test

The time required to heat to 100° C. is measured in Korea Machinery Meter and Petrochemical Testing and Research Institute, which is test authority approved by the nation. The test method is as follow.

The equilibrium reflux boiling point tester was used as stipulated in KS M 2141. A thermometer was put in the side of a flask and sealed with rubber. The bottom tip of the thermometer was placed 6.5 mm above the bottom center of the flask, where the sample 60 ml and 3 boiling stones were put in. As a heating source, a heating pad having holes with the diameter being 32 to 38 mm was used. The flask was heated through the holes of the pad. A cooling device flows out the water whose temperature is less than 28° C. While measured, the temperature increase of the cooling water was maintained to be within 2° C. Starting when the power of the heating pad turns on, the time to reach 100° C. was measured up to second. The results in Table 1 are the average of two measured values.

In Table 2, heating was done for 30 minutes similarly in Table 1 and the temperature was measured every 5 minutes. After stopping heating, cooling was done for 30 minutes similarly and every 5 minutes, the temperature was measured. The amount of the sample used was 120 ml, which is twice of that in Table 1.

3. Corrosion Test

The corrosion test was done as specified in KS M 2142. At first, the test pieces of aluminum, cast iron, steel, brass, lead, and copper were prepared. 148 mg sodium sulfate, 165 mg sodium chloride, and 138 mg sodium bicarbonate were dissolved in 1 liter of water to prepare an aqueous mixture. The feed water was diluted in the aqueous mixture to 30 vol % and the test pieces were immersed in the diluted feed water, into which dry air was introduced at a rate of 100±10 ml/min to maintain the temperature of the test solution within 88±2° C. for 336 hours (14 days). Everyday, the amount of the test solution was checked and the loss due to evaporation was replenished with water. After completing the test, the test pieces were treated with treatment liquid and dried before measuring the weight up to 0.1 mg. The weight change was calculated according to the following formula. The average value was reported after testing each of test samples twice.

$$C=(W'-W)/S,$$

Where C: weight change (mg/cm$^2$)
W': weight of the piece after test (mg)
W: weight of the piece before test (mg)
S: total surface area of the test piece before test (cm$^2$)

INDUSTRIAL APPLICABILITY

As described above, the present invention provides the feed water composition for boilers, which contains the purified glycol aqueous solution consisting of purified glycol and pure water, and also various additives. The use of this feed water composition can prevent the formation of corrosion and scales on internal engines and pipes for boilers, thus making the circulation of the feed water smooth. Also, the feed water can be used semi-permanently without replacement.

The boiler operation time required for heating the inventive feed water composition to 100° C. was reduced by 13.7-20.0% as compared to that for the tap water, meaning energy saving as much. Also, an increase in temperature after heating for 30 minutes was 45.37% higher in the feed water of the present invention than that in the tap water. At 30 minutes after stopping heating, a reduction in the temperature was 46.55% lower in the inventive feed water composition than that in tap water. This implies that the inventive feed water composition shows a very high thermal efficiency during the boiler operation.

Also, the feed water composition of the present invention has a low freezing point. Therefore in severe winter, it does not freeze even when the power of the boiler is off at a vacant house for energy saving. This removes the possibility of cracking internal engines and pipes for boilers.

The invention claimed is:

1. A feed water composition for boilers, which comprises 92.1-98.8 wt % of a mixture of purified ethylene glycol and pure water as main components in a weight ratio of 70-90: 10-30, 0.1-2.0 wt % of sodium benzoate, 0.1-1.5 wt % of tolyltriazole, 0.1-0.7 wt % of triethanol amine, 0.5-1.5 wt % of sodium nitrate, 0.3-1.2 wt % of sodium molybdate, and 0.1-1.0 wt % of potassium hydroxide.

2. The feed water composition of claim 1, wherein the tolyltriazole is used alone or in combination with benzotriazole and mercaptobenzotriazole.

3. The feed water composition of claim 1, wherein the sodium nitrate is used alone or in combination with magnesium nitrate and strontium nitrate.

4. The feed water composition of claim 1, wherein the sodium benzoate is added in the amount of 0.5 to 1.0 wt %.

5. The feed water composition of claim 1, wherein the tolyltriazole is added in the amount of 0.4 to 1.0 wt %.

6. The feed water composition of claim 1. wherein the triethanol amine is added in the amount of 0.2 to 0.5 wt %.

7. The feed water composition of claim 1, wherein the sodium nitrate is added in in the amount of 0.9 to 1.3 wt %.

8. The feed water composition of claim 1, wherein the sodium molybdate is added in the amount of 0.6 to 1.0 wt %.

9. The feed water composition of claim 1, wherein the potassium hydroxide is added in the amount of 0.2 to 0.5 wt %.

10. A feed water composition for boilers, which comprises 92.1-98.8 wt % of a mixture of purified propylene glycol and pure water as main components in a weight ratio of 70-90: 10-30, 0.1-2.0 wt % of sodium benzoate, 0.1-1.5 wt % of tolyltriazole, 0.1-0.7 wt % of triethanol amine, 0.5-1.5 wt % of sodium nitrate, 0.3-1.2 wt % of sodium molybdate, and 0.1-1.0 wt % of potassium hydroxide.

11. A feed water composition for boilers, which comprises 92.1-98.8 wt % of a mixture of purified ethylene glycol and pure water as main components in a weight ratio of 70-90: 10-30, 0.1-2.0 wt % of sodium benzoate, 0.1-1.5 wt % of tolyltriazole, 0.1-0.7 wt % of at least one compound selected from the group consisting of diethanol amine, monoethanol amine, trisopanol amine, disopropanol amine, and cyclohexyl amine, 0.5-1.5 wt % of sodium nitrate, 0.3-1.2 wt % of sodium molybdate, and 0.1-1.0 wt % of potassium hydroxide.

* * * * *